(12) United States Patent  
Calman et al.

(10) Patent No.: US 8,571,888 B2
(45) Date of Patent: Oct. 29, 2013

(54) REAL-TIME IMAGE ANALYSIS FOR MEDICAL SAVINGS PLANS

(75) Inventors: Matthew A. Calman, Charlotte, NC (US); Erik Stephen Ross, Charlotte, NC (US); Alfred Hamilton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/342,048

(22) Filed: Jan. 1, 2012

(65) Prior Publication Data

US 2012/0232937 A1   Sep. 13, 2012

Related U.S. Application Data

(60) Provisional application No. 61/450,213, filed on Mar. 8, 2011, provisional application No. 61/478,393, filed on Apr. 22, 2011, provisional application No. 61/478,409, filed on Apr. 22, 2011, provisional application No. 61/478,412, filed on Apr. 22, 2011, provisional application No. 61/478,394, filed on Apr. 22, 2011, provisional application No. 61/478,399, filed on Apr. 22, 2011, provisional application No. 61/478,402, filed on Apr. 22, 2011, provisional application No. 61/478,405, filed on Apr. 22, 2011, provisional application No. 61/478,397, filed on Apr. 22, 2011, provisional application No. 61/478,408, filed on Apr. 22, 2011, provisional application No.

(Continued)

(51) Int. Cl.
*G06Q 10/00* (2012.01)
*G06Q 40/00* (2012.01)

(52) U.S. Cl.
USPC ................................ 705/2; 705/35

(58) Field of Classification Search
None
See application file for complete search history.

(56) References Cited

U.S. PATENT DOCUMENTS

| 7,016,532 | B2 | 3/2006 | Boncyk et al. |
| 7,155,228 | B2 | 12/2006 | Rappaport et al. |

(Continued)

OTHER PUBLICATIONS

International Searching Authority. PCT International Search Report and Written Opinion dated May 28, 2012. PCT International Application No. PCT/US12/28036. Name of Applicant: Bank of America Corporation. English Language. 11 pages.

(Continued)

*Primary Examiner* — Jason M Borlinghaus
(74) *Attorney, Agent, or Firm* — Michael A. Springs; Moore and Van Allen, PLLC; Peter B. Stewart

(57) ABSTRACT

In general terms, embodiments of the present invention relate to methods, apparatuses, and computer program products for providing health or flexible spending account information in association with products identified in an augmented reality environment. In some embodiments, a method is provided that includes: (a) receiving information associated with an image, where the image was captured by a mobile device; (b) determining, based at least partially on the information associated with the image, that the image shows a product that qualifies for purchase under a medical savings plan; and (c) presenting, via the mobile device, information that indicates that the product qualifies for purchase under the medical savings plan.

39 Claims, 8 Drawing Sheets

Related U.S. Application Data

(60) 61/478,400, filed on Apr. 22, 2011, provisional application No. 61/478,411, filed on Apr. 22, 2011, provisional application No. 61/478,403, filed on Apr. 22, 2011, provisional application No. 61/478,407, filed on Apr. 22, 2011, provisional application No. 61/478,415, filed on Apr. 22, 2011, provisional application No. 61/478,419, filed on Apr. 22, 2011, provisional application No. 61/478,417, filed on Apr. 22, 2011, provisional application No. 61/508,985, filed on Jul. 18, 2011, provisional application No. 61/508,946, filed on Jul. 18, 2011, provisional application No. 61/508,980, filed on Jul. 18, 2011, provisional application No. 61/508,821, filed on Jul. 18, 2011, provisional application No. 61/508,850, filed on Jul. 18, 2011, provisional application No. 61/508,966, filed on Jul. 18, 2011, provisional application No. 61/508,969, filed on Jul. 18, 2011, provisional application No. 61/508,971, filed on Jul. 18, 2011, provisional application No. 61/508,764, filed on Jul. 18, 2011, provisional application No. 61/508,973, filed on Jul. 18, 2011, provisional application No. 61/508,976, filed on Jul. 18, 2011, provisional application No. 61/508,944, filed on Jul. 18, 2011.

(56) References Cited

U.S. PATENT DOCUMENTS

| | | | |
|---|---|---|---|
| 7,403,652 | B2 | 7/2008 | Boncyk et al. |
| 7,412,081 | B2 | 8/2008 | Doi |
| 7,424,303 | B2 | 9/2008 | Al-Sarawi |
| 7,477,780 | B2 | 1/2009 | Boncyk et al. |
| 7,526,280 | B2 | 4/2009 | Jung et al. |
| 7,564,469 | B2 | 7/2009 | Cohen |
| 7,565,008 | B2 | 7/2009 | Boncyk et al. |
| 7,680,324 | B2 * | 3/2010 | Boncyk et al. ............... 382/165 |
| 7,775,437 | B2 | 8/2010 | Cohen |
| 7,792,738 | B2 | 9/2010 | Channell |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 8,138,930 | B1 | 3/2012 | Heath |
| 2003/0064705 | A1 | 4/2003 | Desiderio |
| 2004/0021584 | A1 | 2/2004 | Hartz, Jr. et al. |
| 2004/0024709 | A1 | 2/2004 | Yu et al. |
| 2004/0172285 | A1 * | 9/2004 | Gibson ............................ 705/2 |
| 2006/0100951 | A1 | 5/2006 | Mylet et al. |
| 2007/0140595 | A1 | 6/2007 | Taylor et al. |
| 2007/0260486 | A1 * | 11/2007 | Urich et al. ....................... 705/2 |
| 2008/0040278 | A1 | 2/2008 | DeWitt |
| 2008/0214210 | A1 | 9/2008 | Rasanen et al. |
| 2008/0268876 | A1 | 10/2008 | Gelfand et al. |
| 2009/0094125 | A1 | 4/2009 | Killian et al. |
| 2009/0102859 | A1 | 4/2009 | Athsani et al. |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1 | 7/2009 | Walker |
| 2009/0204511 | A1 | 8/2009 | Tsang |
| 2009/0250515 | A1 | 10/2009 | Todd et al. |
| 2010/0130226 | A1 | 5/2010 | Arrasvuori et al. |
| 2010/0169336 | A1 * | 7/2010 | Eckhoff-Hornback et al. ............................ 707/758 |
| 2010/0185529 | A1 | 7/2010 | Chesnut et al. |
| 2010/0250581 | A1 | 9/2010 | Chau |
| 2011/0022540 | A1 | 1/2011 | Stern et al. |
| 2011/0034176 | A1 | 2/2011 | Lord et al. |
| 2011/0119155 | A1 | 5/2011 | Hammad et al. |

OTHER PUBLICATIONS

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority. PCT International Search Report and Written Opinion dated Jun. 14, 2012. PCT International Application No. PCT/US12/27892. Name of Applicant: Bank of America Corporation. English Language. 19 pages.

International Searching Authority. PCT International Search Report and Written Opinion dated Sep. 24, 2012. PCT International Application No. PCT/US12/48697. Name of Applicant: Bank of America Corporation. English Language. 14 pages.

International Search Report and Written Opinion for International Application No. PCT/US12/27890 mailed Feb. 5, 2013.

* cited by examiner

REAL-TIME IMAGE ANALYSIS FOR MEDICAL SAVINGS PLANS

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,393, filed Apr. 22, 2011, entitled "Real-Time Image Analysis for Medical Savings Plans," the entirety of each of which is incorporated herein by reference.

The systems, methods, computer program products, etc. described herein, may be utilized or combined with any other suitable augmented reality ("AR") related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common and standardized. Such features include, but are not limited to, location-determining devices (e.g., Global Positioning System (GPS) devices), sensor devices (e.g., accelerometers), and high-resolution video cameras. However, most mobile device software is not sufficiently advanced to process images captured by mobile device cameras in real-time. Such software also does not provide any real-time connection between those images and information that is relevant to those images, such as financial information of the mobile device user and/or additional information about the object depicted in the images. Accordingly, there exists a need for an improved system for providing real-time information about images captured by a mobile device. In particular, there exists a need for an improved system for providing real time information about how products depicted in images captured by a mobile device may be eligible for purchase under medical savings plans that may be associated with the user of the mobile device.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In general terms, embodiments of the present invention relate to apparatuses, methods, and computer program products for presenting information associated with flexible spending accounts (FSAs), health savings accounts (HSAs), and/or similarly structured programs (sometimes collectively referred to herein as "medical savings plans" for simplicity) in an augmented reality (AR) environment.

As understood herein, the phrase "augmented reality" generally relates to outputting information at a mobile device based at least partially on, for example, an image captured by the mobile device, GPS coordinates associated with the mobile device, and/or compass information associated with the mobile device. For example, in some embodiments, the mobile device is configured to generate and/or capture a real-time video stream of a real-world environment using a digital camera housed in the mobile device. In such embodiments, the video stream may be viewed by the user of the mobile device in real-time via a display housed in the mobile device. Further, in such embodiments, the mobile device may also be configured to render, display, superimpose, output, and/or otherwise present information in the display of the mobile device, such that the presented information is presented on, over, and/or in the real-time video stream. Still further, in such embodiments, the presented information relates to one or more objects shown in the real-time video stream (e.g., products, people, monuments, landmarks, businesses, etc. shown in the real-time video stream), such as, for example, operating hours of a store shown in the real-time video stream, the menu of a restaurant shown in the real-time video stream, and/or the ingredients of a prescription drug shown in the real-time video stream. By presenting this information over the real-time video stream, an "augmented reality" is created. Of course, it will be understood that a mobile device may be configured to present an AR environment using one or more still images, such that the presented information is superimposed over one or more still images instead of or in addition to a video stream.

As understood herein, a medical savings plan generally refers to a plan in which a participant defers, allocates, or sets-aside earnings, savings, or other funds into an account, so that the money may then be used on certain, predetermined medical and/or healthcare-related goods and expenses. In practice, consumers often utilize medical savings plans to defer earnings into a tax-exempt account that may be later used for qualified purchases. However, problems often arise as a result of participants not knowing which products qualify for purchase under the medical saving plan. This problem is magnified by the fact that pursuant to the rules of many of these plans, consumers will lose their tax deferred earnings if they do not use the earnings on qualified purchases within a predetermined period of time (e.g., the calendar year).

According to some embodiments of the invention, a user of a mobile device may approach a product at a store and use the mobile device to determine whether the product qualifies for purchase under the user's medical savings plan (and/or another medical savings plan). Specifically, in some embodiments, the user operates the mobile device to capture a real-time video stream of the product. According to some embodiments of the present invention, an image of the product, which may be a portion of the real-time video stream, is transmitted to an AR apparatus (e.g., apparatus, mainframe, database system, etc.) located remotely from the mobile device (e.g., at the financial institution and/or health care provider that maintains the medical savings plan). In such embodiments, the AR apparatus determines that the image shows a product that qualifies for purchase under the medical savings plan. In some alternative embodiments, the mobile device, instead of the AR apparatus, determines whether the product qualifies for purchase under the medical savings plan. In still other embodiments, the AR apparatus may be incorporated into the mobile device.

After determining whether the product qualifies, in some embodiments, the AR apparatus (and/or the mobile device) presents, dynamically, automatically, in real-time, and/or via the mobile device, information that indicates that the product qualifies for purchase under the medical savings plan. In some embodiments, the information is presented as an indicator, which, in some embodiments, is a colored shape that surrounds the product shown in the image (and/or shown on the mobile device's display). By viewing the indicator, the user can know whether the product qualifies for purchase under the medical savings plan. In some embodiments of the invention, the indicator is selectable such that if the user selects the indicator, the indicator will display additional information about the product and/or information about the user's medical savings plan.

In more general terms, embodiments of the present invention relate to apparatuses, methods, and computer program products for presenting information associated with medical savings plans in an augmented reality (AR) environment. For example, in some embodiments of the present invention, a method is provided that includes: (a) receiving information associated with an image, where the image was captured by a mobile device; (b) determining, based at least partially on the information associated with the image, that the image shows a product that qualifies for purchase under a medical savings plan; and (c) presenting, via the mobile device, information that indicates that the product qualifies for purchase under the medical savings plan.

In some embodiments of the invention, receiving information associated with an image comprises receiving information associated with an image that is part of a real-time video stream. In other embodiments, receiving information associated with an image comprises receiving information associated with a still image. In yet some other embodiments, receiving information associated with an image comprises receiving the image.

In some embodiments, determining that the image shows a product that qualifies for purchase under a medical savings plan comprises determining that the product qualifies for purchase under a health savings account or flexible spending account.

In some embodiments, determining, based at least partially on the information associated with the image, that the image shows a product that qualifies for purchase under a medical savings plan comprises identifying the product based at least partially on the information associated with the image and determining that the product qualifies for purchase under the medical savings plan by comparing information about the product to information about a known set of products that qualify for purchase under a medical savings plan.

In other embodiments, determining, based at least partially on the information associated with the image, that the image shows a product that qualifies for purchase under a medical savings plan comprises comparing the information associated with the image with information about products that qualify for purchase under a medical savings plan.

In some embodiments, presenting, via the mobile device, information that indicates that the product qualifies for purchase under the medical savings plan comprises displaying, on a display of the mobile device, information that indicates that the product qualifies for purchase under the medical savings plan. In some embodiments, displaying, on a display of the mobile device, information that indicates that the product qualifies for purchase under the medical savings plan comprises superimposing, over a real-time video stream being captured by the mobile device, information that indicates that the product qualifies for purchase under the medical savings plan.

In some embodiments, the method includes displaying on the display of the mobile device, a review of the product. In other embodiments, the method includes, displaying, on the display of the mobile device, a contraindication of the product, which as one of skill in the art will appreciate is a condition or factor that serves to withhold using the product. In other embodiments, the method includes, displaying, on the display of the mobile device, a recommended use of the product. In other embodiments, the method includes, displaying, on the display of the mobile device, an ingredient of the product. In other embodiments, the method includes, displaying, on the display of the mobile device, a price of the product. In other embodiments, the method includes, displaying, on the display of the mobile device, a link to a website where the product can be purchased. In still some other embodiments, the method includes displaying, on the display of the mobile device, a balance of the medical savings plan.

In some embodiments, the method includes determining that the mobile device is capturing a real-time video stream that shows the product before presenting, via the mobile device, information that indicates that the product qualifies for purchase under the medical savings plan.

In some embodiments, presenting, via the mobile device, information that indicates that the product qualifies for purchase under the medical savings plan comprises presenting the information in the image proximate to the product shown in the image. In other embodiments, presenting, via the mobile device, information that indicates that the product qualifies for purchase under the medical savings plan comprises presenting an indicator that can be selected by a user of the mobile device to output information about the product.

In some embodiments, presenting, via the mobile device, information that indicates that the product qualifies for purchase under the medical savings plan comprises notifying the mobile device that the product qualifies for purchase under the medical savings plan.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
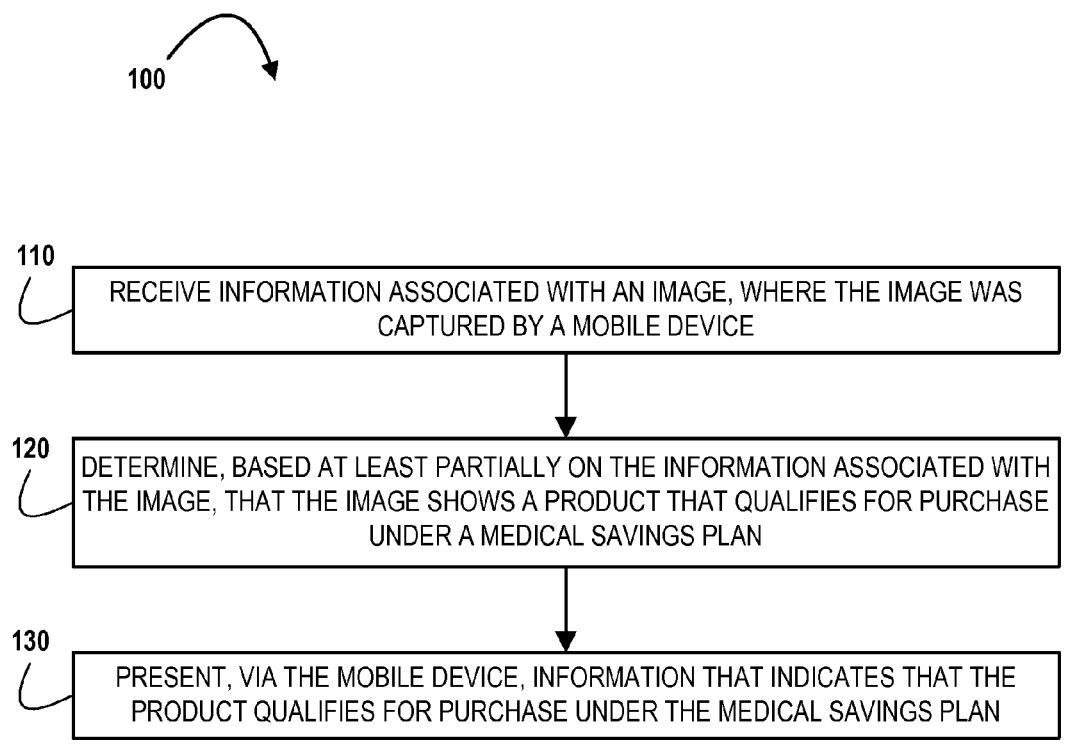
Figure 2:
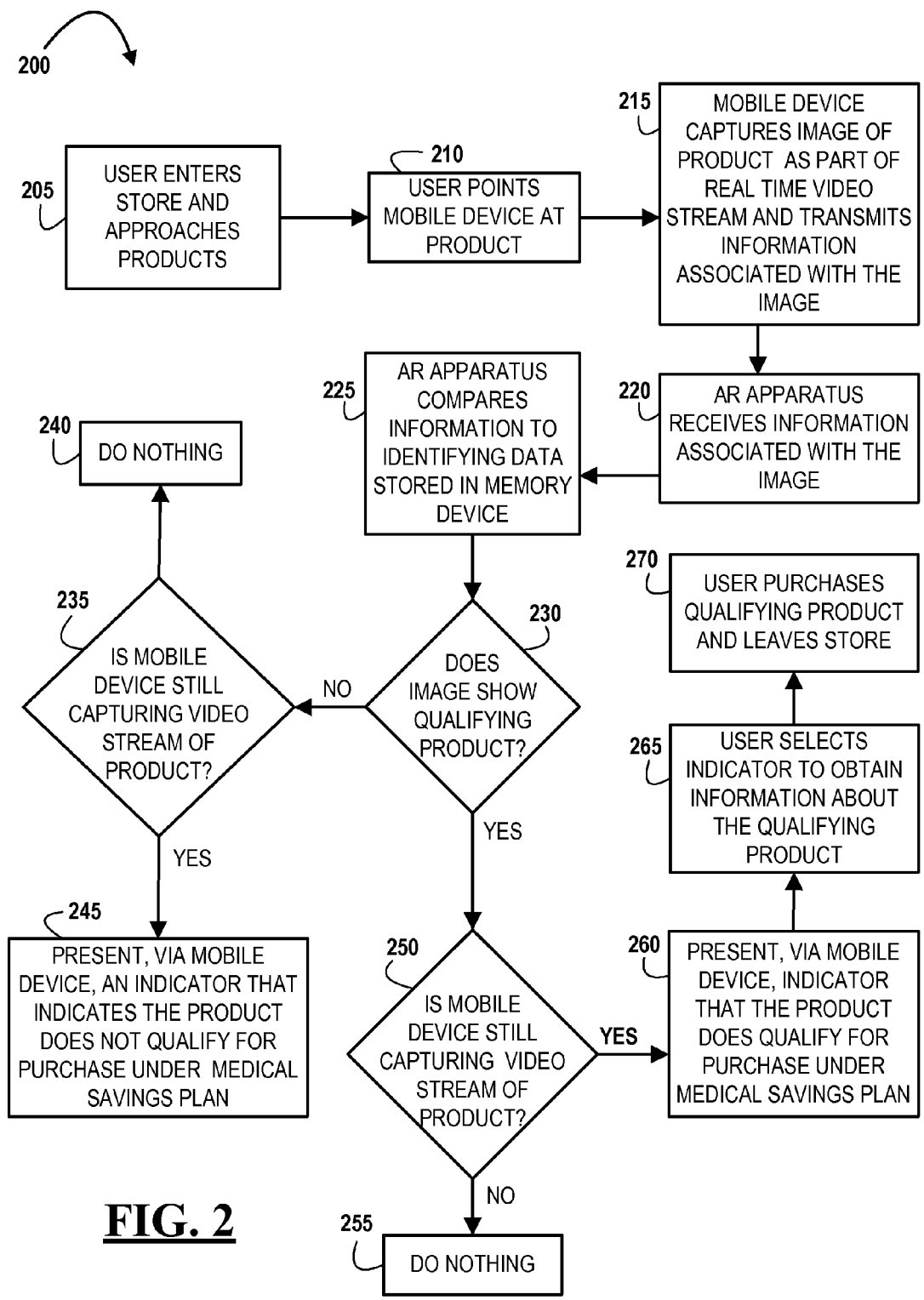
Figure 3:
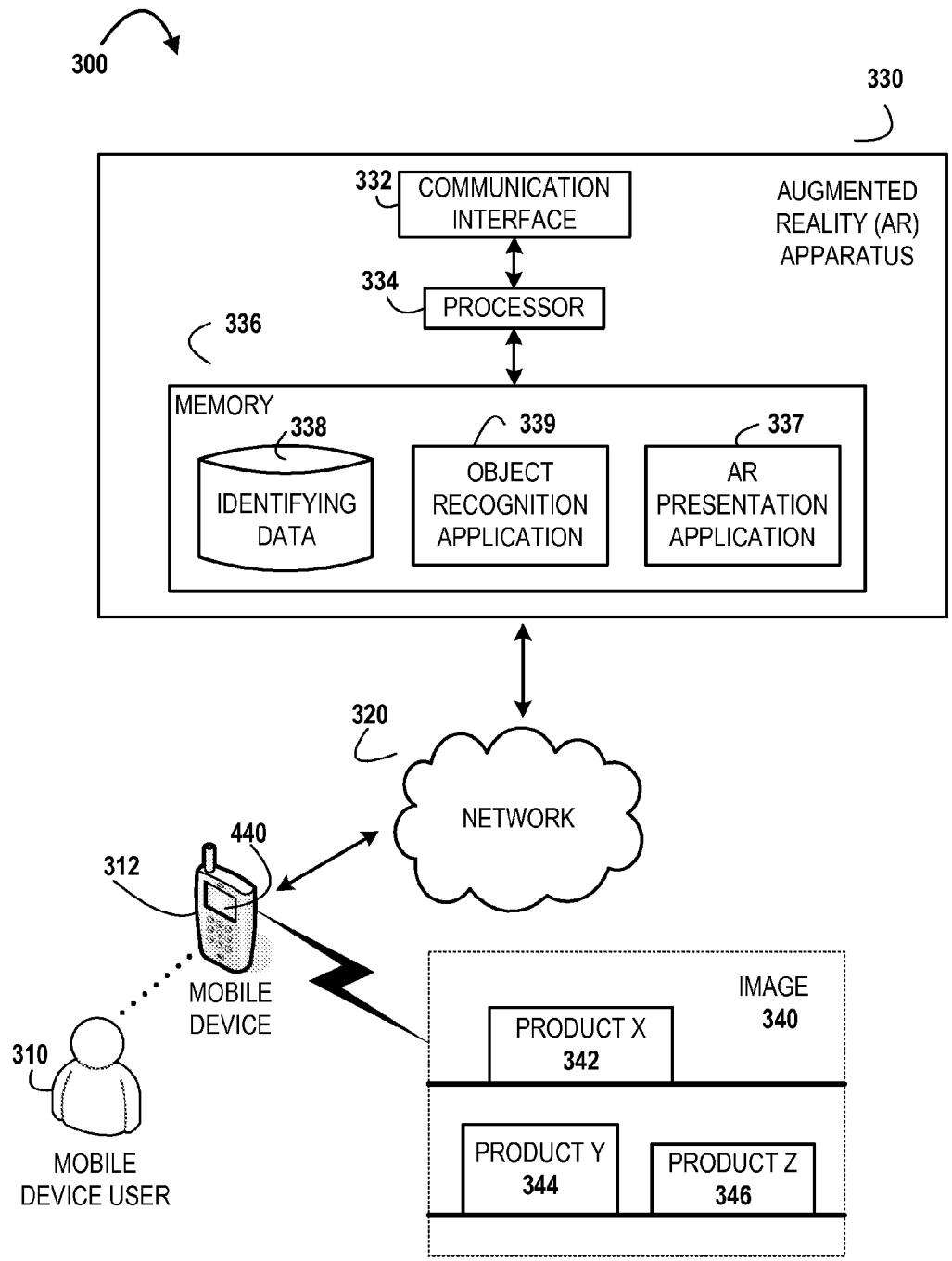
Figure 4:
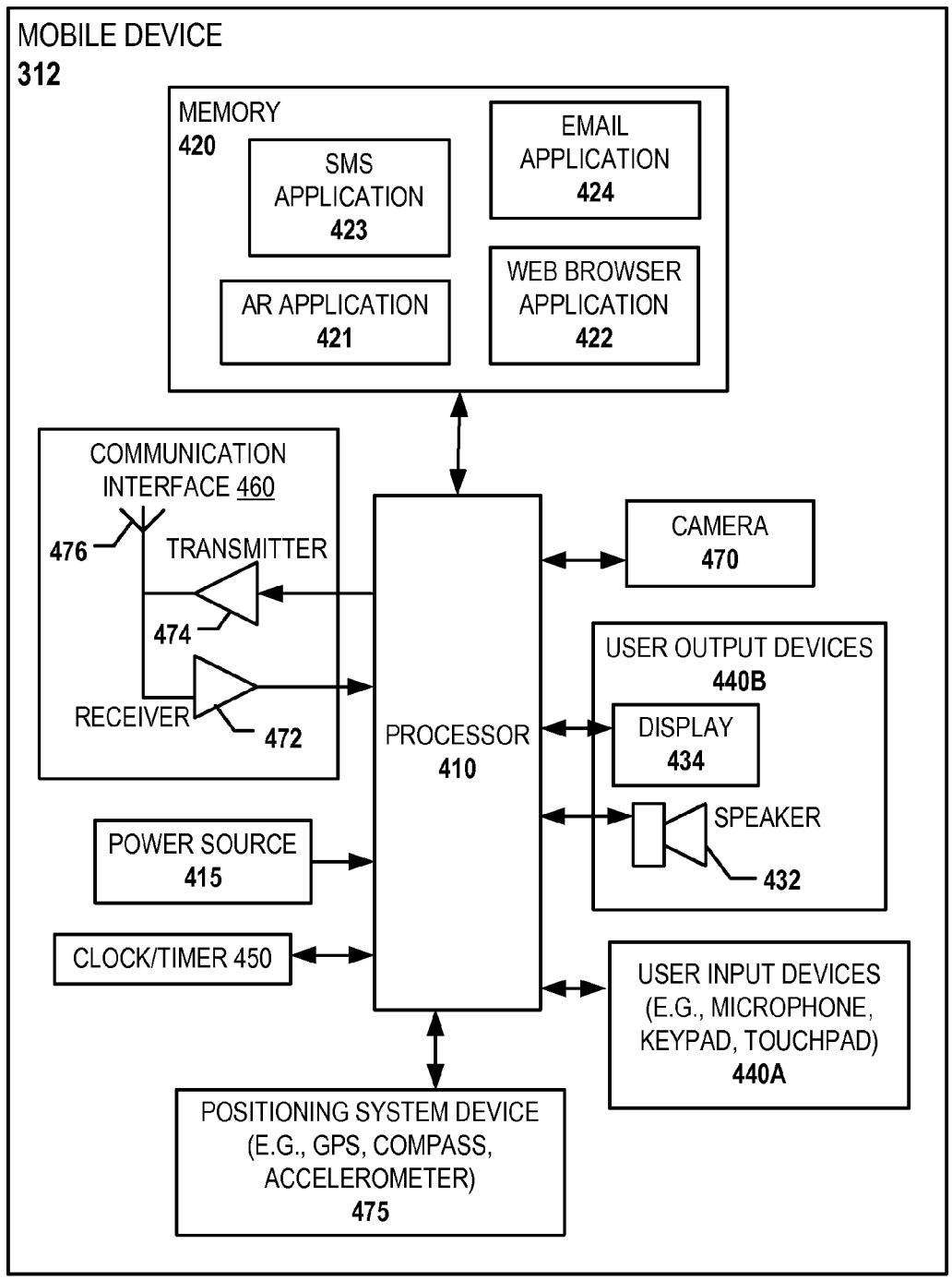
Figure 5:
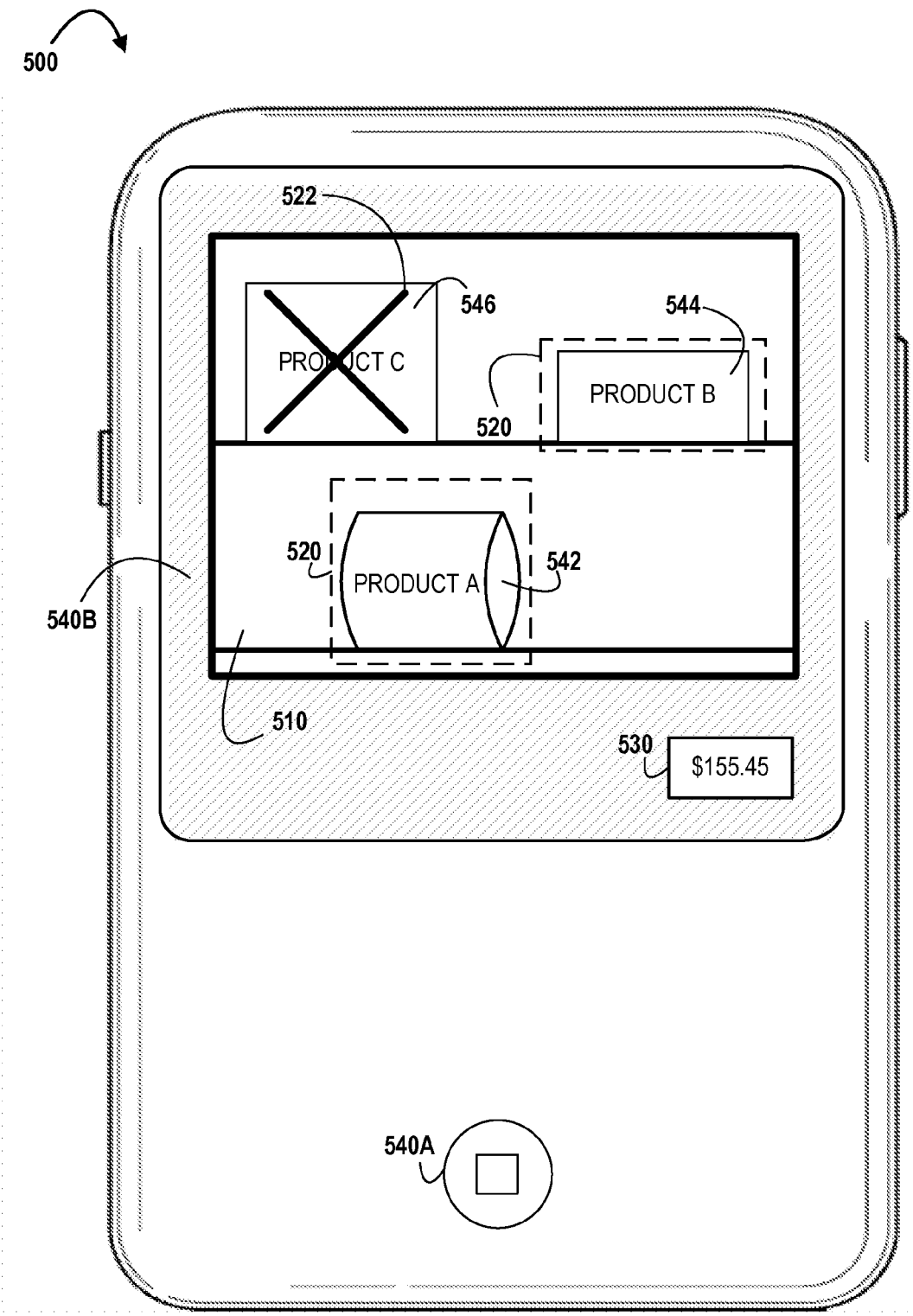
Figure 6:
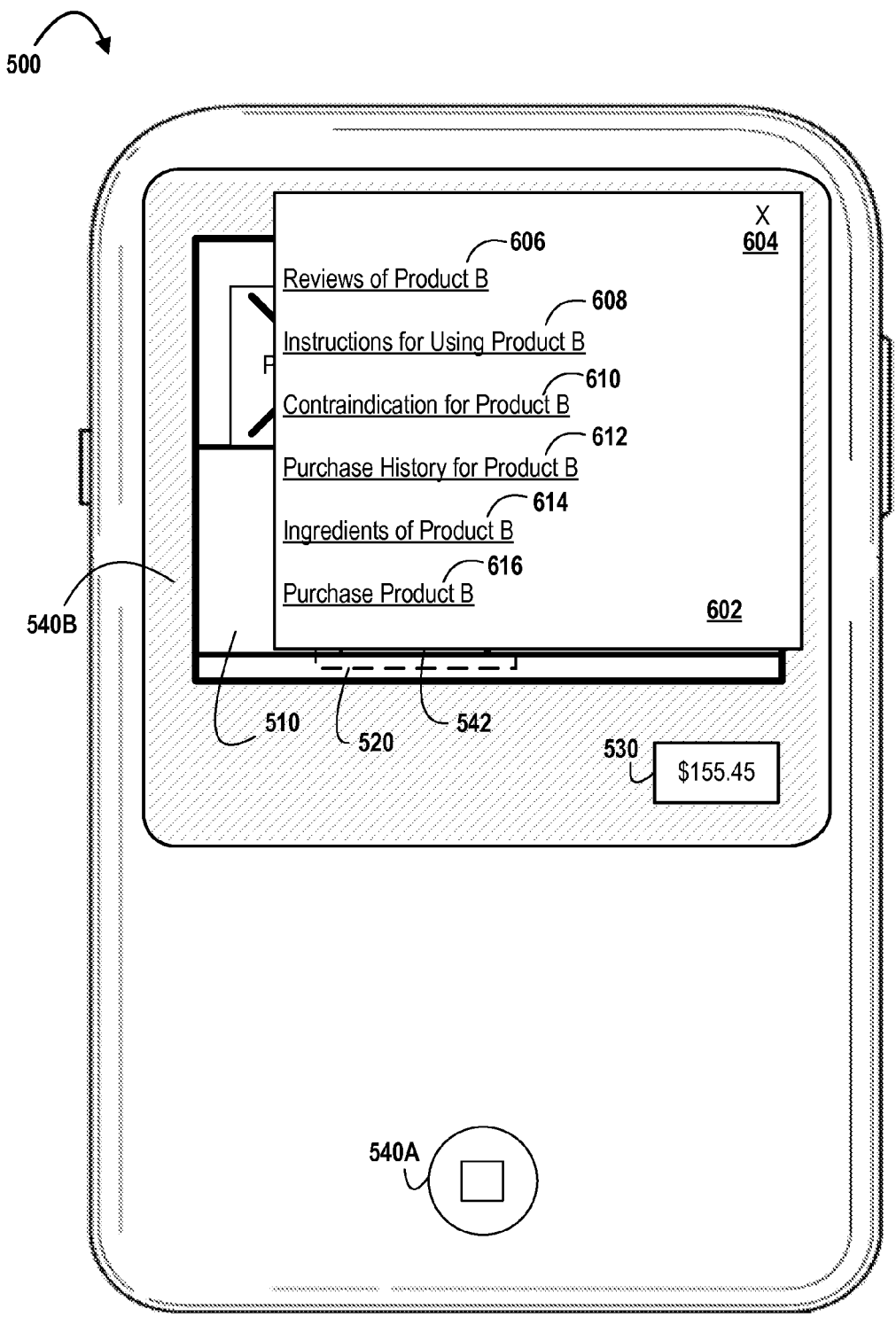
Figure 7:
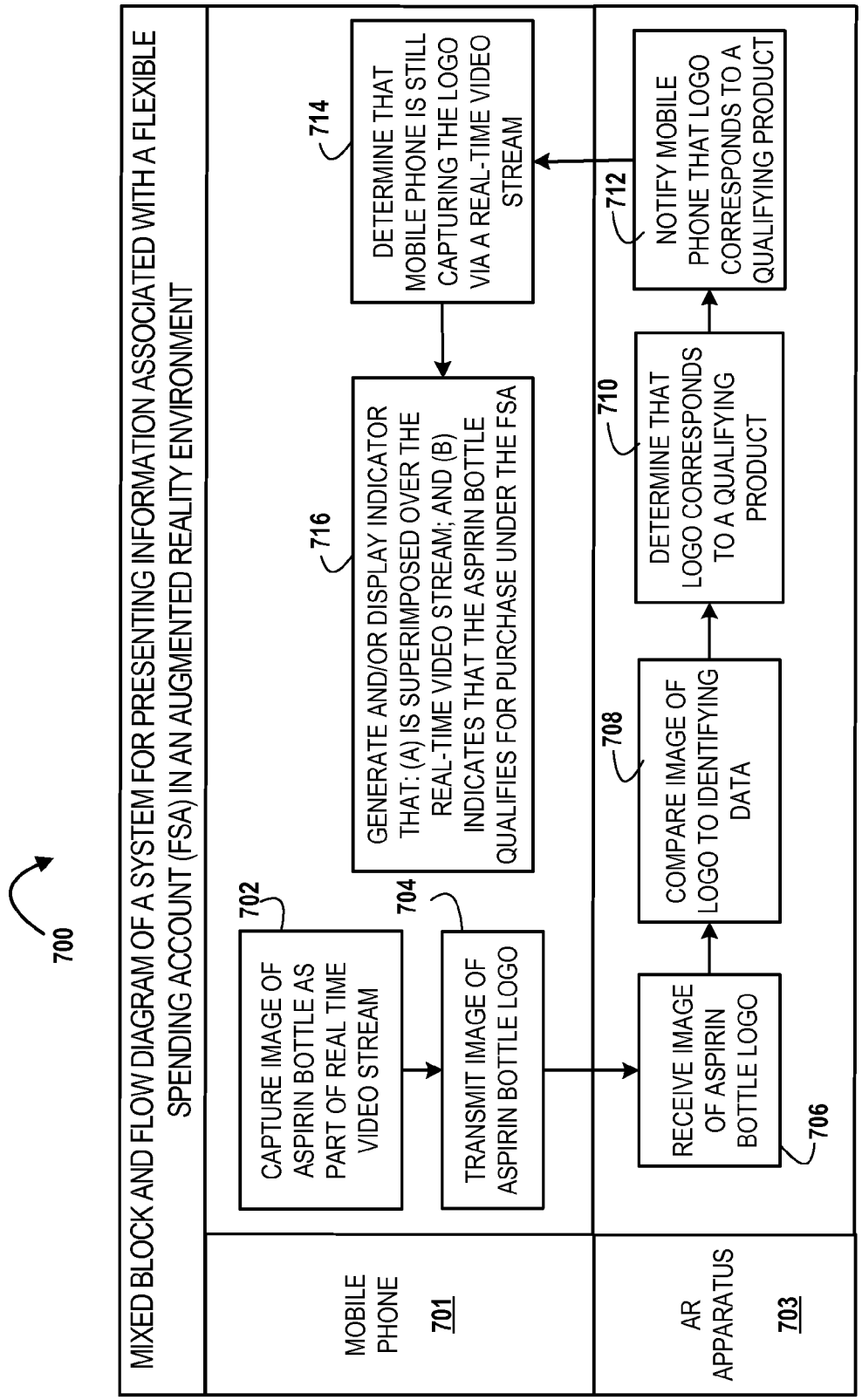
Figure 8:
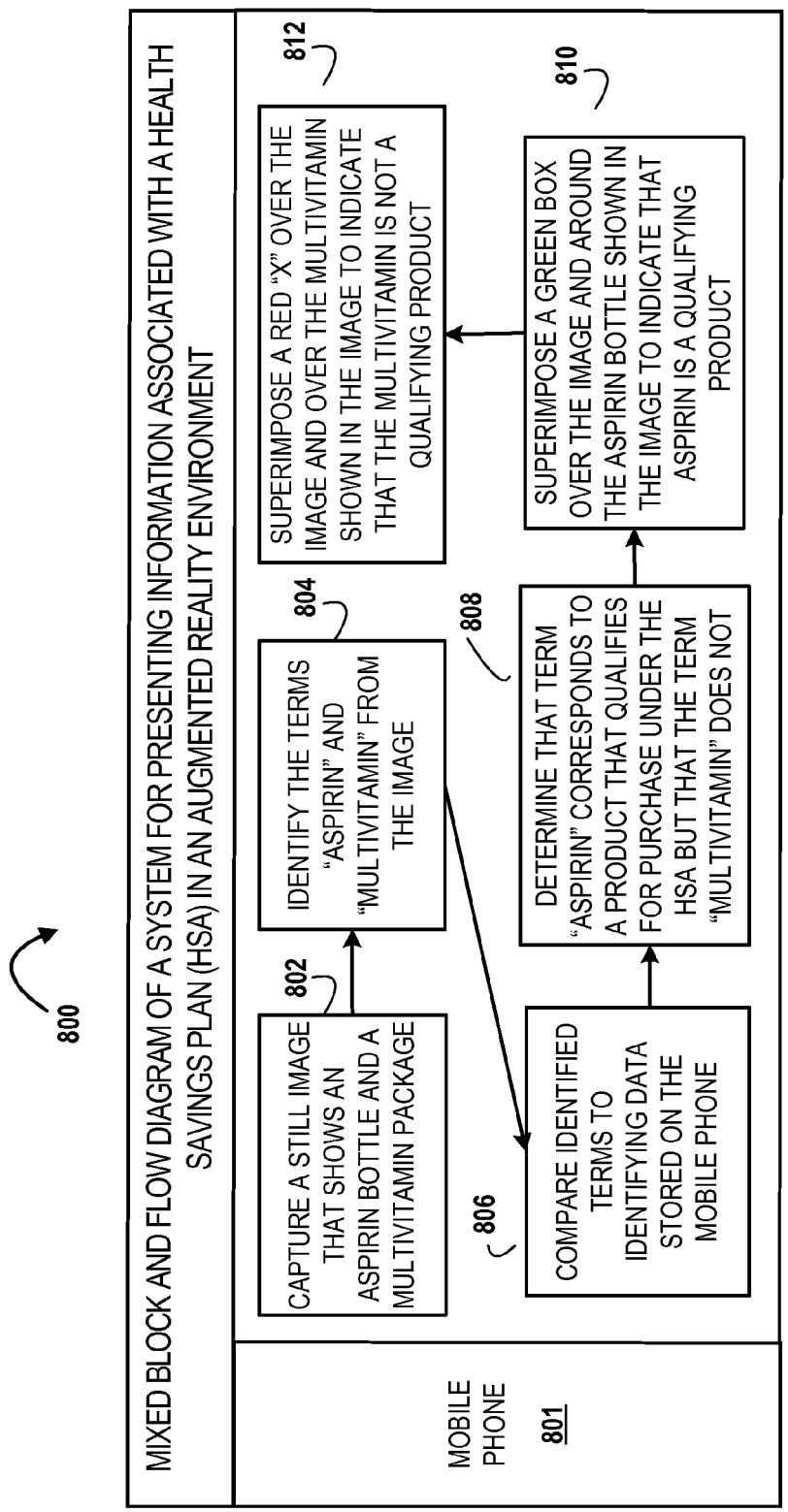

Having thus described some embodiments of the present invention in general terms, reference will now be made to the accompanying drawings, where:

FIG. 1 is a flow diagram illustrating a general process flow for presenting information associated with a medical savings plan in an AR environment, in accordance with an embodiment of the present invention;

FIG. 2 is a flow diagram illustrating a more-detailed process flow for presenting information associated with a medical savings plan in an AR environment, in accordance with an embodiment of the present invention;

FIG. 3 is a block diagram illustrating technical components of a system for presenting information associated with a medical savings plan in an AR environment, in accordance with an embodiment of the present invention;

FIG. 4 is a block diagram illustrating technical components of a mobile device configured to present and/or participate in the presentation of information associated with a medical savings plan in an AR environment, in accordance with an embodiment of the present invention;

FIG. 5 illustrates an exemplary AR environment shown on a display of a mobile device, in accordance with an embodiment of the present invention;

FIG. 6 illustrates another exemplary AR environment shown on a display of a mobile device, in accordance with an embodiment of the present invention;

FIG. 7 is a mixed block and flow diagram of a system for presenting information associated with a FSA in an AR environment, in accordance with an embodiment of the present invention; and FIG. 8 is a mixed block and flow diagram of a system for presenting information associated with a HSA in an AR environment, in accordance with an embodiment of the present invention.

DETAILED DESCRIPTION OF EMBODIMENTS OF THE PRESENT INVENTION

Referring now to FIG. 1, a general process flow 100 is provided for presenting information associated with a medical savings plan in an AR environment. Process flow 100 may also be implemented to determine whether a product qualifies under a medical savings plan. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive information associated with an image, where the image was captured by a mobile device. As represented by block 120, the apparatus is also configured to determine, based at least partially on the information associated with the image, that the image shows a product that qualifies for purchase under a medical savings plan. In addition, as represented in block 130, the apparatus is configured to present, via the mobile device, information that indicates that the product qualifies for purchase under the medical savings plan.

The term "determine," in some embodiments, is meant to have one or more of its ordinary meanings (i.e., its ordinary dictionary definition(s)), but in other embodiments, that term is meant to have one or more ordinary meanings of one or more of the following terms: decide, conclude, verify, ascertain, find, discover, learn, calculate, observe, read, and/or the like. Further, in some embodiments, the phrase "based at least partially on," is meant to have one or more of its ordinary meanings, but in other embodiments, that phrase is meant to have one or more ordinary meanings of one or more of the following terms and/or phrases: as a result of, because, after, if, when, in response to, and/or the like.

It will also be understood that the apparatus having the process flow 100 can include one or more separate and/or different apparatuses. For example, in some embodiments, a first apparatus (e.g., the AR apparatus 330 described in connection with FIG. 3) is configured to perform the portions of the process flow 100 represented by blocks 110 and 120, and a second apparatus (e.g., the mobile device 312) is configured to perform the portion of the process flow 100 represented by block 130. Alternatively, in other embodiments, a single apparatus (e.g., the mobile device 312, the AR apparatus 330, etc.) is configured to perform all of the portions of process flow 100 represented by blocks 110-130. In some embodiments, a single apparatus performs all of the portions of process flow 100 and has the combined functionality of mobile device 312 and AR apparatus 330.

Regarding block 110, the image may be any number and/or type of image(s). For instance, in some embodiments, the image is a still image captured by the mobile device. Alternatively, in other embodiments, the image is created by scanning a photograph or other type of picture. In some embodiments, the image is a single frame from a real-time video stream captured by the mobile device. In yet another embodiment, the image is created through the use of graphic design software or illustration software. In some embodiments the image is the portion of another image. In some embodiments, the image may be an image of a product and the user wants to determine whether the product qualifies under a medical savings plan.

In some embodiments of the invention, the image was captured while a user of the mobile device was located in a store. For example, in some embodiments, the user may capture an image of a product located on a shelf. In yet other embodiments of the invention, the user may see a product on a video image (e.g., a television commercial, etc.) or a print image (e.g., a newspaper advertisement, etc.) and capture an image of the video or print image.

Further regarding block 110, the phrase "information associated with an image" can be any amount or type of information associated with an image. For example, in some embodiments, the information associated with an image is the image itself. In some embodiments, the information associated with an image is a portion of the image. In other embodiments, the information associated with an image includes metadata about the image, which could be decoded or coded into the image or stored elsewhere. In some embodiments, the information associated with an image is the results of any analysis of the image (e.g., image comparison analysis, pattern recognition analysis, character recognition or optical character recognition (i.e., "OCR"), and/or image recognition analysis). In another embodiment of the invention, the information associated with an image is the output of any modeling and/or composite imaging processes that are based all or in part on the image. In yet another embodiment, the information associated with an image is information concerning the location of an object (e.g., the product) shown in the image.

The mobile device referred to in block 110 may be any mobile communication device, such as, for example, a mobile phone, personal digital assistant (PDA), mobile Internet accessing device, pager, mobile television, portable gaming device, laptop and/or tablet computer, camera, video recorder, audio/video player, radio, GPS device, and/or the like. Also, the term "captured," with reference to FIG. 1, generally refers to any method in which a mobile device generates, acquires, displays, and/or stores an image. In some embodiments of the invention, the mobile device captures the image by using digital camera functionality. In some embodiments of the invention, the mobile device captures the image by using digital video recording functionality. In yet other embodiments of the invention, the mobile device captures the image by reading any type of storage medium, such as a flash memory card, that contains the image. In some embodiments, the image of the product is captured by exposing the product to a digital camera and/or other image capture device that is housed in and/or operatively connected to the mobile device.

In some embodiments, the mobile device and/or the AR apparatus access one or more databases or datastores (not shown) to search for and/or the AR apparatus retrieve information related to an image or the objects depicted therein. The mobile device and/or the AR apparatus can access one or more datastores local to the mobile device and/or the AR apparatus or, the mobile device and/or the AR apparatus can access datastores remote to the mobile device and/or the AR apparatus. In some embodiments, the mobile device and/or the AR apparatus access both a memory and/or datastore local to the mobile device and/or the AR apparatus as well as a datastore remote from the mobile device and/or the AR apparatus.

The apparatus having the process flow 100 receives the information associated with an image through a network. In some embodiments, the apparatus receives the information associated with the image via a wireless and/or contactless network. In some embodiments, the apparatus receives the information associated with the image via second-generation (2G) wireless communication protocols (e.g., IS-136 (time division multiple access (TDMA), GSM (global system for mobile communication), and/or IS-95 (code division multiple access (CDMA)), third-generation (3G) wireless communication protocols (e.g., Universal Mobile Telecommunications System (UMTS), CDMA2000, wideband CDMA (WCDMA) and/or time division-synchronous CDMA (TD-SCDMA)), fourth-generation (4G) wireless communication protocols, and/or the like. In some other embodiments, the apparatus having the process flow 100 is configured to receive the information associated with the image in accordance with non-cellular communication mechanisms, such as via a wireless local area network (WLAN), global area network (GAN), a wide-area network (WAN), the Internet, and/or other communication/data networks. In other embodiments, the apparatus having the process flow 100 receives the information associated with the image through wired communications.

Regarding block 120, the phrase "shows a product" generally refers to an image that shows, illustrates, depicts, and/or represents one or more portions of the product. For example, in some embodiments, the image shows the product if the product is visible anywhere in the image. The product may be in the foreground of the image, or the product may be in the background of the image. Furthermore, the entire product may be visible in the image or only a portion of the product may be visible in the image. The portion of the product that may be visible in the image may include, without limitation, the product's logo, the product's bar code, the product's name, and/or any portion of the product and/or the product's packaging. In some embodiments, the image shows the product even if the product is not visible in the image. For instance, in some embodiments, the image shows the product if some type of identifiable feature is visible in the image that indicates that the product is nearby.

Further, as used in relation to block 120, the phrase "qualifies for purchase under a medical savings plan" generally refers to any product that may be purchased using earnings, savings, and/or other funds that have been deferred, allocated, and/or set aside in a medical savings plan. For simplicity, the phrase "qualifying product" is sometimes used herein to refer to a product that qualifies for purchase under a medical savings plan. In some embodiments, an administrator of a medical savings plan determines which products are qualifying products under the medical savings plan.

In some embodiments, the user indicates to the apparatus having the process flow 100 the medical savings plan in which the user participates. In some embodiments, the user may make this indication through the use of the mobile device. In some embodiments, the apparatus having the process flow 100 will store the information relating to the user's medical savings plan and the apparatus will use this information to determine if the product qualifies for purchase under the medical savings plan.

Regarding block 120, the apparatus having the process flow 100 may use any means to determine that the image shows a qualifying product. In some embodiments, the apparatus utilizes one or more methods (e.g., pattern recognition algorithms, text comparison, and/or data comparison) to analyze information associated with the image and compare such information with identifying data of qualifying products (hereinafter referred to as "identifying data"). In some embodiments, if the information associated with the image matches the identifying data, either exactly or with a certain degree of confidence, then the apparatus determines that the image shows a qualifying product. If the information associated with the image does not match the identifying data, either exactly or with a certain degree of confidence, then the apparatus determines that the image does not show a qualifying product.

In some embodiments, the apparatus uses pattern recognition algorithms such as decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels (e.g., Bayesian networks and/or Markov random fields), ensemble learning algorithms (e.g., bootstrap aggregating), boosting, ensemble averaging, combinations thereof, and/or the like to determine that the image shows a product that qualifies for purchase under the medical savings plan.

The identifying data may be any number and/or type of data that identifies a qualifying product. In some embodiments of the invention, the identifying data includes: the size, shape, and/or color of the qualifying product's packaging; the qualifying product's logo (e.g., trademark, trade dress, name, etc.); store keeping unit (SKU) and/or bar code information associated with the qualifying product; the ratio of the size of one feature of the qualifying product and/or its packaging to another feature; the qualifying product's physical location; and/or the appearance of the qualifying product itself (as opposed to its packaging). In some embodiments, the identifying data concerns a very small feature of the qualifying product, such as the alphanumeric characters that identify the qualifying product, whereas, in other embodiments, the indentifying data concerns the entire qualifying product or package, such as the unique shape, size, structure etc.

The identifying data may be stored in one or memory devices of the one or more apparatuses that perform the portions of the process flow 100. In some embodiments, the identifying data is added to the memory device by the user or a third party. In some embodiments, the user or third party adds the identifying data to a memory device and then associates the identifying data with at least the name of the qualifying product. In other embodiments, the identifying data is associated with any other type of additional information about the qualifying product.

In other embodiments of block 120, the apparatus utilizes other metrics to determine that the image shows a product that qualifies for purchase under the medical savings plan. For instance, the apparatus may utilize the user's location or any number of other conceivable factors in determining whether the image shows a product that qualifies for purchase under the medical savings plan. Moreover, the user may input preferences or other metrics for which the apparatus may utilize to narrow results of identified products.

In yet another embodiment of block 120, the information associated with the image may match one or more pieces of identifying data, such that the apparatus having the process flow 100 determines that the image shows more than one qualifying product. In some embodiments, the user is presented with the multiple candidate identifications and chooses the appropriate identification or inputs a different identification. The multiple candidates may be presented to the user by any means. For instance, in one embodiment, the candidates are presented to the user as a list, where the "strongest" candidate (i.e., the one most likely represent the product in the image) is listed first based on reliability of the identification. Upon input by the user identifying the product, the apparatus "learns" from the input and stores additional identifying data in order to avoid multiple identification candidates for the same product in future identifications.

In some embodiments of the invention, the apparatus having the process flow 100 stores identifying data for different medical savings plans. In embodiments where the user indicates to the apparatus the medical savings plan in which the user participates, the apparatus uses this indication to determine which identifying data should be used when determining if the product is a qualifying product under the medical savings plan.

In some embodiments of the invention, the determining that the image shows a product that qualifies for purchase under a medical savings plan is a two-step process. In such embodiments, in the first step, the apparatus having the process flow 100 identifies the product based at least partially on the information associated with the image. Once the apparatus has identified the product shown in the image, then the apparatus performs a second step in which it determines if that product qualifies for purchase under the medical savings plan.

Regarding block 130, the phrase "information that indicates that the product qualifies for purchase under the medical savings plan" generally means any amount and/or type of information that indicates (e.g., informs the user) that the product qualifies for purchase under the medical savings plan. In some embodiments, the information is embodied as one or more indicators, such as, for example, one or more tabs, tags, highlighted areas, hot spots, links, graphics, pop-ups, icons, and/or images. In some embodiments, the one or more indicators are located proximate (e.g., adjacent, near, next to, touching, over, etc.) to the product shown in the image and/or displayed on the display of the mobile device. An indicator may be any color, shape, and/or size. For example, in some embodiments, the presented indicator is green if the product qualifies for purchase under the medical savings plan. In embodiments where all or part of the indicator is a line, the line may be solid, dashed, dotted, or any combination thereof. As one of skill in the art will appreciate, an "indicator", as used herein, is also a type of indication (i.e., a visual indication).

In some embodiments, the indicator is selectable by the user of the mobile device. For example, in some embodiments, the user selects the indicator and the indicator displays information related to the qualifying product or the medical savings plan on the mobile device display. The information may include any desired information concerning the qualifying product and may range from basic information to detailed information. For example, in some embodiments, the indicator displays information associated with an opinion of at least one consumer who has used the qualifying product (e.g., a review of the product), one or more contraindications of the qualifying product, comparison of generic and brand name product (e.g., for ingredients, price, user reviews, etc.) one or more warnings relating to the use of the qualifying product, one or more links to medical records, one or more uses (e.g., recommended uses) of the qualifying product, one or more ingredients of the qualifying product, external postings (e.g., websites, social network sites, etc.), or information regarding the qualifying product, purchase history of the qualified product, other retailers in the vicinity that currently have offers for the qualifying product, the lowest price available for the qualifying product (whether online or at a retailer), and/or one or more prices of the qualifying product at one or more stores. In some embodiments, the indicator includes and/or is embodied as a link that enables the user to obtain further information on the qualifying product and/or enable the user to purchase the qualifying product. In other embodiments, the indicator may include a cross reference to the user's current medications to prevent drug allergy reaction or to demonstrate the cross reactivity of drugs. The indicator may provide a link to video instructions or video prescription information from the user's physician. In yet other embodiments, the indicator may include a selection to automatically purchase the qualifying product from a retail store or online using the individual's HSA or FSA, such as by using a bank card associated with the HAS or FSA. As one of ordinary skill in the art will appreciate, the present invention may display any amount or type of information about the qualifying product that may be of interest to the user.

In embodiments in which the indicator is selectable, the user may select the indicator in any way. For instance, in some embodiments, the user utilizes an input device, such as a keyboard to highlight and select the indicator in order to retrieve the information. In some embodiments, the user selects the indicator by the touch screen display of the mobile device. In other embodiments, the user selects the indicator by using voice commands.

In some embodiments, the indicator is not selectable and simply provides information to the user by displaying information on the display of the mobile device without having to select the indicator. For example, in some embodiments, the indicator identifies a qualifying product, identifies the qualifying product's name/title, and/or gives brief information about the qualifying product, etc., rather than providing extensive details that require the user to select and/or otherwise interact with the indicator.

Furthermore, the indicator may be displayed at any size on the mobile device display. In some embodiments, the indicator is small enough that it is positioned on, next to, or around the image of the qualifying product displayed on the mobile device display. In some embodiments, the image of the qualifying product displayed on the mobile device display remains discernible next to the indicator. In some embodiments, the indicator is semi-transparent such that the image of the qualifying product displayed on the mobile device display remains discernible behind the indicator. In some embodiments, the image of the qualifying product on the mobile device display is discernible because the indicator forms an outline of the qualifying product or otherwise surrounds the qualifying product. In yet some other embodiments, the indicator is large enough to completely cover the qualifying product displayed on the mobile device display. Indeed, in some embodiments, the indicator covers a majority and/or the entirety of the mobile device display.

Further regarding block 130, the phrase "present, via the mobile device" generally means presenting an indication via the mobile device. In some embodiments, the apparatus presents, via the mobile device, by outputting information via an output device of the mobile device. For example, in some embodiments, the apparatus presents the information by showing the information as a graphical indication on the display of the mobile device. As another example, in some embodiments, the apparatus presents the information by audibly outputting the information via a speaker of the mobile device. In some embodiments, where the information is presented as an indicator, the apparatus having the process flow 100 presents the indicator by superimposing the indicator over a real-time video stream that is captured by the mobile device. This real-time video stream shows the qualifying product on the mobile device display. In some embodiments, the indicator is superimposed over the real-time video stream only if the real-time video stream still shows the product. Thus, in some embodiments, the apparatus having the process flow 100 (e.g., the AR apparatus 330, the mobile device 312) is configured to determine whether the mobile device is still capturing a real-time video stream that shows the product.

In some embodiments of the invention, "presenting" includes transmitting a still image of the qualifying product to the mobile device, where the still image contains the indicator. The still image may be transmitted to the mobile device via email, MMS services, picture messages, and/or any other methods known to those skilled in the art. In some other embodiments of the invention, "presenting" includes notifying the mobile device that the captured image shows a qualifying product. In some of these embodiments, the mobile device then generates and/or presents the information to the user of the mobile device.

Although not illustrated in FIG. 1, in some alternative embodiments, the apparatus having the process flow 100 also presents, via the mobile device, information that a second product shown in the image does not qualify for purchase under the medical savings plan. In some embodiments, the presented information includes and/or is embodied as an indicator that is displayed on the mobile device display. In some embodiments, the indicator that indicates that the product does not qualify for purchase under the medical savings plan is red. In some embodiments, that indicator is shaped as an "X" or a cross to indicate that the product does not qualify for purchase under the medical savings plan. In some embodiments, the indicator that indicates that the product does not qualify for purchase under the medical savings plan is located proximate to the non-qualifying product.

Referring now to FIG. 2, a more-detailed process flow 200 for presenting information associated with a medical savings plan in an AR environment is provided, in accordance with an embodiment of the present invention. In some embodiments, one or more portions of the process flow 200 are performed by an apparatus having hardware and/or software configured to perform one or more portions of the process flow 200. In some of these embodiments, the apparatus configured to perform the process flow 100 is also configured to perform the process flow 200. As such, it will be understood that the process flow 200 illustrated in FIG. 2 represents an example embodiment of the process flow 100 described in connection with FIG. 1.

As represented by block 205, a user physically enters a store and approaches a product that is located in the store. The store may be a grocery store, pharmacy, convenience store, or any other location where products are located. In some embodiments of the invention, the user approaches a shelf where a product is located. In other embodiments of the invention, the user stands at a counter, where the product is located behind the counter. As one of ordinary skill in the art will appreciate, it does not matter whether the store is offering the product for sale or if the user is required to use some alternative method to acquire the product.

After approaching the product, at block 210, the user points a mobile device at the product. In this process flow, the user points the mobile device at the product such that the product is within the field of view of the mobile device's digital video recording functionality. However, in other embodiments of the invention, the user points the mobile device at the product such that the product is within the field of view of the mobile device's digital camera functionality.

At block 215, the mobile device user captures an image of the product as part of a real-time video stream. In some embodiments, the real-time video stream is captured via the mobile device's digital video recorder functionality. In some embodiments, the image is a single frame of the real-time video stream. In some embodiments, the user executes an AR application, which is configured to run on the mobile device and begin real-time video capture. However, in some other embodiments, the AR application includes an "always on" feature in which the mobile device is continuously capturing real-time video. In such embodiments, the AR application may be configured to alert the user that a particular product has been identified. The user may set any number of user preferences to tailor the AR experience to his/her needs. For instance, the user may opt to only be alerted if a certain qualifying product is identified. Additionally, it will be appreciated that the "always on" feature in which video is continuously captured may consume the mobile device power source more quickly. Thus, in some embodiments, the "always on" feature may disengage if a determined event occurs such as low power source, low levels of light for an extended period of time (e.g., such as if the mobile device is in a user's pocket obstructing a clear view of the environment from the mobile device), if the mobile device remains stationary (thus receiving the same video stream) for an extended period of time, the user sets a certain time of day to disengage, etc. Conversely, if the "always on" feature is disengaged due to the occurrence of such an event, the user may opt for the "always on" feature to re-engage after the duration of the disengaging event (e.g., power source is re-charged, light levels are increased). Further, at block 215, the mobile device transmits information associated with the image to the AR apparatus. In some embodiments, the information associated with the image is transmitted via a cellular network, such as a wireless communication protocol, and in other embodiments, the information is transmitted via a non-cellular network, such as a WLAN, WAN, GAN, and/or the Internet. In other embodiments, especially where the AR apparatus is incorporated into the mobile device, the information associated with the image is transmitted via a wireline network.

At block 220, the AR apparatus receives the information associated with the image captured at block 215. In some embodiments of the invention, where the information associated with the image is the image itself, the AR apparatus receives the image which corresponds to a frame from the real-time video stream. In other embodiments, the information associated with the image is the bar code information for the product. In other embodiments, the information associated with the image is information concerning the appearance of the product's packaging. In some embodiments, the AR apparatus receives the information associated with the image via a cellular network, such as a wireless communication protocol, and in other embodiments, the AR apparatus receives the information via a non-cellular network, such as a WLAN, WAN, GAN, and/or the Internet. In other embodiments, the AR apparatus may receive the information via a wireline network.

At block 225, the AR apparatus compares the information associated with the image to identifying data stored in a memory device to determine if the image shows a qualifying product. The identifying data is any type of data that would identify a product as a qualifying product. In some embodiments of the invention, the identifying data includes: the size, shape or color of a qualifying product's packaging; a qualifying product's logo; the bar code information associated with a qualifying product; the ratio of the size of one feature of a qualifying product and/or its packaging to another feature; a qualifying product's physical location; and/or the appearance of a qualifying product itself (as opposed to its packaging). In some embodiments, the identifying data concerns a very small feature of the qualifying product, such as the alpha-numeric characters that identify the qualifying product, whereas, in other embodiments, the indentifying data concerns an entire qualifying product and/or package, such as the unique shape, size, structure etc. In some embodiments of the invention, the AR apparatus uses pattern recognition algorithms to compare the information associated with the image to identifying data.

In some embodiments of the invention, the memory device is incorporated into the AR apparatus. In some other embodiments, the memory device may be incorporated into a separate computer system and the AR apparatus may communicate with the memory device over a wireless or wireline network. In some embodiment, the memory device may be incorporated into the mobile device.

At block 230, the AR apparatus determines whether the image shows a qualifying product. In some embodiments, the AR apparatus only determines that the image shows a qualifying product if there is a 100% match between the information associated with the image and the identifying data (i.e., the information associated with the image is identical to the identifying data). In some embodiments, the AR apparatus determines that the image shows a qualifying product if the correlation between the information associated with the image and the identifying data exceeds a predetermined confidence threshold. In some embodiments, if the AR apparatus determines that the image does not show a qualifying product, then the process flow proceeds to block 235.

At block 235, the AR apparatus and/or the mobile device determines whether the mobile device is still capturing a real-time video stream of the product. In some embodiments of the invention where the mobile device performs all or part of the steps of process flow 200, block 235 is performed by the mobile device. In other embodiments of the invention where the AR apparatus performs all or part of the steps of process flow 200, block 235 is performed by the AR apparatus. In some embodiments, the mobile device determines that the mobile device is still capturing a real-time video stream of the product by receiving information associated with the images that comprise the real-time video stream being currently captured by the mobile device. In other embodiments, the mobile device transmits information to the AR apparatus indicating that it is still capturing a real-time video stream of the product. If the mobile device and/or AR apparatus determine that the mobile device is not still capturing a real-time video stream of the product, then the AR apparatus and/or mobile device do nothing, as shown at block 240. However, if the AR apparatus and/or mobile device determine that the mobile device is still capturing a real-time video stream that shows the product, then the AR apparatus and/or mobile device present, via the mobile device, an indicator that the product does not qualify for purchase under the medical savings plan, as shown in block 245.

Returning to block 230, if the AR apparatus determines that the image shows a qualifying product, then the process flow proceeds to block 250. Similar to block 235, at block 250, the AR apparatus and/or the mobile device determines whether the mobile device is still capturing a real-time video stream of the product. If the mobile device is not still capturing a real-time video stream of the product, then the AR apparatus and/or the mobile device do nothing, as shown in block 255. However, if the mobile device is still capturing a real-time video stream that shows the product, then the AR apparatus and/or mobile device present, via the mobile device, an indicator that indicates that the product does qualify for purchase under the medical savings plan, as shown at block 260.

As one of ordinary skill in the art will appreciate, if the AR apparatus and/or mobile device determines that the mobile device is not currently capturing a real-time video stream of the product at either block 235 or block 250, but later determines that that the mobile device is capturing a real-time video stream of the product, then the AR apparatus and/or mobile device may still present, via the mobile device, an indicator (as described in relation to either block 245 or block 260).

At block 260, the AR apparatus and/or mobile device presents, via the mobile device, an indicator that indicates that the product qualifies under the medical savings plan. Generally, the indicator is displayed on the mobile device display. In some embodiments, the indicator is superimposed over the real-time video stream that is captured by the mobile device. The indicator may be any color and it may any shape. In some embodiments of the invention, the indicator appears as a solid line that surrounds the product displayed on the mobile device display. In some embodiments, a list of qualifying products may be presented. In other embodiments, the indicator may be semi-transparent and appear on top of the product displayed on the mobile device display.

In some embodiments, as represented by block 265, the indicator is selectable, such that the user may select the indicator and retrieve information related to the qualifying product. In accordance with some embodiments, selecting the indicator displays and/or audibly outputs any type of additional information about the product on the mobile device display and/or via the mobile device speakers or headset. In some embodiments of the invention, selecting the indicator displays information about: the opinion of at least one consumer who has used the qualifying product, contraindications of the qualifying product, warnings related to the use of the qualifying product, the recommended use of the qualifying product, the ingredients of the qualifying product, and/or the price of the qualifying product. In some embodiments, selecting the indicator provides information about the medical savings plan. In some embodiments, the indicator provides a hyperlink to enable the user to obtain further information about the qualifying product and/or enable the user to purchase the qualifying product by directing the user to a website where qualifying product is offered for sale. In some embodiments, the indicator itself is a hyperlink, and in other embodiments, selecting the indicator will present the user with a hyperlink.

At block 270, the user purchases the qualifying product and then leaves the store. In some embodiments of the invention, the user purchases the qualifying product at the store by physically bringing the qualifying product to a cash register, point-of-sales device, or through the use of other in-store check-out means. In some embodiments of the invention, the user purchases the qualifying product through an online banking application or virtual wallet application that is accessed through the mobile device. In other embodiments of the invention, the user selects the indicator to access a hyperlink that enables the user to purchase the qualifying product from a website. In some embodiments, the user purchases the qualifying product from the website of the store where the user is currently located, pays for the qualifying product online, and then takes the qualifying product from the store. In other embodiments, the user purchases the qualifying product online from a vendor and then that vendor ships or delivers the qualifying product to the user. In such embodiments, where the qualifying product is shipped or delivered to the user, the user leaves the store without possessing the qualifying product.

Referring now to FIG. 3, a system 300 is illustrated for presenting information associated with a medical savings plan in an AR environment. As illustrated, system 300 includes network 320, an AR apparatus 330, and a mobile device 312. FIG. 3 also shows a mobile device user 310 (sometimes referred to herein as user 310) and an image 340. The AR apparatus 330 generally includes a processor 334 communicably coupled to such devices as a memory 336 and communication interface 332.

The processor 334 and other processors described herein may generally include circuitry for implementing communication and/or logic functions of the AR apparatus 330. For example, the processor 334 may include a digital signal processor device, a microprocessor device, and various analog to digital converters, digital to analog converters, and/or other support circuits. Control and signal processing functions of the AR apparatus 330 may be allocated between these devices according to their respective capabilities. The processor 334 thus may also include the functionality to encode and interleave messages and data prior to modulation and transmission. The processor 334 may additionally include an internal data modem. Further, the processor 334 may include functionality to operate one or more software programs or applications, which may be stored as computer-readable code in the memory 336.

The processor 334 may be configured to use the communication interface 332 to communicate with one or more other devices on a network. The processor 334 may be configured to provide signals to and receive signals from the communication interface 332. In some embodiments, the signals may include signaling information in accordance with the air interface standard of the applicable cellular system of the wireless telephone network that may be part of the network. In this regard, the AR apparatus 330 may be configured to operate with one or more air interface standards, communication protocols, modulation types, and access types. For example, the AR apparatus 330 may be configured to operate in accordance with second-generation (2G) wireless communication protocols, third-generation (3G) wireless communication protocols, fourth-generation (4G) wireless communication protocols, and/or the like. The AR apparatus 330 may also be configured to operate in accordance with non-cellular communication mechanisms, such as via a wireless local area network (WLAN), global area network (GAN), a wide-area network (WAN), the Internet, and/or other communication/data networks.

In some embodiments, the processor 334 may also be capable of operating one or more applications, such as one or more applications functioning as an artificial intelligence ("AI") engine. The processor 334 may recognize objects that it has identified in prior uses by way of the AI engine. In this way, the processor 334 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or AR apparatus, an indication that the object may be the same object previously recognized. In this regard, the AI engine may provide a baseline or starting point from which to determine the nature of the object. In other embodiments, the AI engine's recognition of an object is accepted as the final recognition of the object.

As further illustrated in FIG. 3, the AR apparatus 330 includes memory 336. In some embodiments, the memory 336 contains object recognition application 339 and AR presentation application 337. Object recognition application 339 and AR presentation application 337 include computer code that, when executed by the processor 334, perform one or more of the AR functions described herein in relation to the AR apparatus 330. In some embodiments, object recognition application 339 is configured to perform the process described in relation to block 120 of FIG. 1 and AR presentation application 337 is configured to perform the process described in relation to block 130 of FIG. 1. The memory 336 also includes data stored therein, such as the identifying data 338. In some embodiments, the AR apparatus 330 may be maintained and stored by a financial institution, bank, third-party service provider, and/or any other entity that wishes to provide the functionality described herein. In other embodiments, AR apparatus 330 or portions thereof may be incorporated into mobile device 312.

As indicated in FIG. 3, the network 320 may include one or more telephone networks (e.g., cellular networks, CDMA networks, any wireline and/or wireless network over which communications to telephones and/or mobile phones are sent), local area networks (LANs), wide area networks (WANs), global area networks (GANs) (e.g., the Internet), and/or one or more other telecommunications networks. For example, in some embodiments, the network 320 includes a telephone network (e.g., for communicating with the mobile device 312). It will also be understood that the network 320 may be secure and/or unsecure and may also include wireless and/or wireline technology. In some embodiments, the network 320 is a wireless network.

In this embodiment, the image 340 is an image generated and/or captured by the mobile device 312. In some embodiments, the image 340 shows the field of view of the mobile device 312. It will be understood that the image 340 may be a still image and/or an image that is part of a real-time video stream captured by the mobile device 312 (e.g., by a digital camera and/or video recorder of the mobile device 312). In this example embodiment, the image 340 shows Product X 342, Product Y 344 and Product Z 346. In some embodiments, the mobile device user 310 uses the mobile device 312 and the AR apparatus 330 to determine if Products X-Y 342-346 are qualifying products (i.e., whether those products qualify for purchase under a medical savings plan). In some embodiments, Products X-Z 342-346 are health care products, pharmaceutical products, prescription medicines, vitamins, cold/flu remedies, and/or dietary supplements. In other, in other embodiments, Products X-Z 342-346 are any physical object that may exist within the mobile device's field of view.

In this embodiment, the mobile device 312 may be any mobile device configured to provide and/or participate in the presentation of information associated with a medical savings plan in an augmented reality environment, including, for example, a mobile phone, personal digital assistant (PDA), a mobile Internet accessing device, pager, mobile television, portable gaming device, laptop or tablet computer, camera, video recorder, audio/video player, radio, GPS device, and/or the like. As shown in FIG. 3 and FIG. 4, the mobile device 312 may generally include a processor 410 communicably coupled to such devices as a memory 420, user output devices 440B, user input devices 440A, a communication interface 460, a power source 415, a clock or other timer 450, a camera 470, and positioning system device 475.

In some embodiments, the mobile device 312 and/or AR apparatus 330 access one or more databases or datastores (not shown) to search for and/or retrieve information related to an image or object contained therein. In some embodiments, the mobile device 312 and/or AR apparatus 330 access one or more datastores local to the mobile device 312 and/or AR apparatus 330 and in other embodiments, the mobile device 312 and/or AR apparatus 330 access datastores remote to the mobile device and/or AR apparatus. In some embodiments, the mobile device 312 and/or AR apparatus 330 access both a memory and/or datastore local to the mobile device and/or AR apparatus 330 as well as a datastore remote from the mobile device 312 and/or AR apparatus 330.

In some embodiments, the camera 470 is a digital camera configured to capture still images. In other embodiments, the camera 470 is a digital video recorder configured to capture a real-time video stream. In other embodiments, the camera 470 embodies both digital camera functionality and digital video functionality. The processor 410 (and other processors described herein) may generally include circuitry for implementing communication and/or logic functions of the mobile device 312. For example, the processor 410 may include a digital signal processor device, a microprocessor device, and various analog to digital converters, digital to analog converters, and/or other support circuits. Control and signal processing functions of the mobile device 312 may be allocated between these devices according to their respective capabilities. The processor 410 thus may also include the functionality to encode and interleave messages and data prior to modulation and transmission. The processor 410 may additionally include an internal data modem. Further, the processor 410 may include functionality to operate one or more software programs or applications, which may be stored in the memory 420. For example, the processor 410 may be capable of operating a connectivity program, such as a web browser application 422. The web browser application 422 may then allow the mobile device 312 to transmit and receive web content, such as, for example, location-based content and/or other web page content, according to a Wireless Application Protocol (WAP), Hypertext Transfer Protocol (HTTP), and/or the like.

The processor 410 may also be capable of operating applications, such as an AR application 421. The AR application 421 may be downloaded from a apparatus and stored in the memory 420 of the mobile device 312. In other embodiments, the AR application 421 may be pre-installed on the memory 420. In some embodiments, the AR 421 application consists of computer-readable code that when executed by the processor 410 provides the AR functionality described herein with regards to the mobile device 312.

As illustrated in FIG. 4, which is a detailed illustration of mobile device 312, the processor 410 may be configured to use the communication interface 460 to communicate with one or more other devices on a network. In this regard, the communication interface 460 may include an antenna 476 operatively coupled to a transmitter 474 and a receiver 472 (together a "transceiver"). The processor 410 may be configured to provide signals to and receive signals from the transmitter 474 and the receiver 472, respectively. The signals may include signaling information in accordance with the air interface standard of the applicable cellular system of the wireless telephone network that may be part of the network. In this regard, the mobile device 312 may be configured to operate with one or more air interface standards, communication protocols, modulation types, and access types. In some embodiments, the mobile device 312 may be configured to operate in accordance with second-generation (2G) wireless communication protocols, third-generation (3G) wireless communication protocols, and/or fourth-generation (4G) wireless communication protocols, and/or the like. The mobile device 312 may also be configured to operate in accordance with non-cellular communication mechanisms, such as via a WLAN, WAN, GAN, the Internet and/or other communication/data networks.

In some embodiments, the processor 410 may also be capable of operating one or more applications, such as one or more applications functioning as an artificial intelligence ("AI") engine. The processor 410 may recognize objects that it has identified in prior uses by way of the AI engine. In this way, the processor 110 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or AR apparatus, an indication that the object may be the same object previously recognized. In this regard, the AI engine may provide a baseline or starting point from which to determine the nature of the object. In other embodiments, the AI engine's recognition of an object is accepted as the final recognition of the object.

As described above, the mobile device 312 may have a user interface 440 that includes user output devices 440B and/or user input devices 440A. The user output devices 440B may include a display 434 (e.g., a liquid crystal display (LCD) or the like) and a speaker 432 or other audio device, which are operatively coupled to the processor 410. The user input devices 440A, which may allow the mobile device 312 to receive data from the user 310, may include any of a number of devices allowing the mobile device 312 to receive data from a user, such as a keypad, keyboard, touch-screen, touchpad, microphone, mouse, joystick, other pointer device, button, soft key, and/or other input device(s).

The mobile device 312 may further include a power source 415. Generally, the power source 415 is a device that supplies electrical energy to an electrical load. In one embodiment, the power source 415 may convert a form of energy such as solar energy, chemical energy, mechanical energy, etc. to electrical energy. Generally, the power source 415 in the mobile device 312 may be a battery, such as a lithium battery, a nickel-metal hydride battery, or the like, that is used for powering various circuits, e.g., the transceiver circuit, and other devices that are used to operate the mobile device 312. Alternatively, the power source 415 may be a power adapter that can connect a power supply from a power outlet to the mobile device 312. In such embodiments, a power adapter may be classified as a power source "in" the mobile device.

The mobile device 312 may also include a memory 420 operatively coupled to the processor 410. As used herein, memory may include any computer readable medium configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory may additionally or alternatively include an electrically erasable programmable read-only memory (EEPROM), flash memory or the like.

The memory 420 may store any of a number of applications or programs which include computer-executable instructions/code executed by the processor 410 to implement the functions of the mobile device 312 described herein. For example, the memory 420 may include such applications as an AR application 421, a web browser application 422, an SMS application, an email application 424, etc. Although not depicted in FIG. 4, in some embodiments of the invention, the memory 420 may store all or part of object recognition application 339, AR presentation application 337, and the identifying data 338.

In some embodiments, the information provided by the real-time video stream may be compared to data provided to the system through an API. In this way, the data may be stored in a separate API and be implemented by request from the mobile device and/or AR apparatus accesses another application by way of an API Referring now to FIG. 5, a mobile device 500 is provided for presenting information associated with a medical savings plan in an augmented reality environment, in accordance with an embodiment of the present invention. In some embodiments, the mobile device 500 shown in FIG. 5 is the mobile device 312 shown in FIG. 3 and FIG. 4. As shown in FIG. 5, the mobile device 500 includes a user input device 540A and a display 540B. The display 540B shows an image 510 captured by the mobile device 500. It will be understood that the image 540 may be a still image or an image from a real-time video stream.

In this embodiment, the image 510 shows Product A 542, Product B 544, and Product C 546. Products A-C 542-546 are located on two shelves shown in the image 510. For example, the user of the mobile device (not shown) may be located in a pharmacy and may use the mobile device 500 in accordance with one or more (or all) portions of the process flows described in FIG. 1 and/or FIG. 2 to determine if Products A-C 542-546 are qualifying products (i.e., products that qualify for purchase under a medical savings plan).

FIG. 5 also illustrates the box indicators 520, which are displayed in the display 540B of the mobile device 500 and superimposed over the image 510. In this example embodiment, the box indicators 520 surround Product A 542 and Product B 544 to indicate that Product A 542 and Product B 544 qualify for purchase under a medical savings plan. Also shown in FIG. 5 is an "X" indicator 522. In this example embodiment, the "X" indicator 522 is displayed in the display 540B of the mobile device 500, superimposed over the image 510, and indicates that Product C 546 does not qualify for purchase under the medical savings plan.

It will be understood that the box indicators 520 and the "X" indicator 522 may be one or more separate and/or different colors. In this embodiment, the box indicators 520 are depicted as dashed lines that surround Product A 342 and Product B 344. However, in other embodiments of the invention, the box indicators 520 may be any other shape or size.

FIG. 5 also illustrates a balance 530 of the medical savings plan shown in the display 540B of the mobile device 500. As shown, the balance 530 indicates the amount of funds and/or credit remaining in the medical savings plan (i.e., $155.45). In some embodiments of the invention, the balance 530 is determined by accessing medical savings account information stored on the mobile device 500 and/or some other remote apparatus (e.g., the AR apparatus 330). Additionally or alternatively, in some embodiments, the balance 530 is "pulled" from the remote apparatus and/or "pushed" to the mobile device 500.

In some embodiments, the box indicators 520 and/or the "X" indicator 522 are selectable (e.g., by a user of the mobile device 500) to provide additional information relating to the products to which those indicators correspond. For example, FIG. 6 illustrates a pop-up window 602, which appears on the display 540B of the mobile device 500 when the mobile device user selects the selectable box indicator 520 associated Product B 544. As shown, in this example embodiment, the window 602 includes information about Product B 544, such as a user review 606 of Product B 544, one or more instructions 608 for using Product B 544, one or more contraindications 610 of Product B 544, a purchase history 612 (e.g., the mobile device user's purchase history) of Product B 544, the one or more ingredients 614 of Product B 544, and/or a link 616 to purchase Product B 544. The information contained in window 602 concerning Product B 344 may come from any source, including third party websites, third-party submitted content, and/or the user of the mobile device 500. In some embodiments, the window 602 may include any other information, text, and/or hyperlinks related to Product B 344 and/or to a medical savings plan. Also as shown in FIG. 6, the window 602 may include a selectable icon 604, which upon being selected by the user, closes window 602. The selectable icon 604 may be any shape, size, and/or color.

In this example embodiment, the window 602 is displayed in the display 540B of the mobile device 500 and is positioned on top of (e.g., superimposed over) the image 510. Of course, it will be understood that the window 602 and/or the information contained therein may be presented in other ways. For instance, in some embodiments, the information included in window 602 may appear integrated into the display MOB of the mobile device 500, such that the information does not cover up any of the image 510. In other embodiments, the window 602 and/or the information contained within may take up all or part of the display 540B of the mobile device 500. In some other embodiments, where the indicator 520 is not selectable, the information contained within window 602 may be displayed to the user on the display 540B without the user having to select any portion of the display 540B.

As illustrated in FIG. 6 and described above, the window 602 contains information about Product B 544. The review 606 may include information about at least one other person who has used Product B 544. The review 606 may take the form of text or images, which may describe the experience that other people have had in using Product B 544. The instructions 608 may include any information about the one or more ways to use Product B 544. The contraindications 610 may include any information about the one or more contraindications of Product B 544. The purchase history 612 may feature any information about the purchase history of product 544. In some embodiments of the invention, the purchase history 612 includes information about whether the user of the mobile device 500 has previously purchased Product B 544. In other embodiments, the purchase history 612 may include information about whether a person associated with the mobile device user (such as a relative, friend, and/or co-worker) has previously purchased Product B 544. The purchase history 612 may, in some embodiments, be determined by reviewing bank or other financial information (e.g., the transaction history for the mobile device user). In some embodiments, this determination is made by reviewing merchant information, and in particular, the information of any merchant that has previously sold Product B 544. Also, the ingredients 614 may include any information about the one or more ingredients of Product B 544. Lastly, in some embodiments, the purchase link 616 includes one or more hyperlinks to one or more websites where the mobile device user may purchase Product B 544. In some embodiments of these embodiments, the purchase link 616 enables the user to purchase Product B 544 through the use of a mobile banking application and/or virtual wallet application.

Referring now to FIG. 7, a mixed block and flow diagram of a system 700 is provided for presenting information associated with a flexible spending account (FSA) in an augmented reality environment. In general terms, FIG. 7 illustrates an embodiment of the invention where a user uses a mobile phone 701 to capture a real-time video stream of an aspirin bottle (e.g., while in a pharmacy) to determine whether aspirin is a qualifying product (i.e., whether aspirin qualifies for purchase under the FSA). It will be understood that the mobile phone 701 is accessible to the user referred to in block 702. In some embodiments, the user may activate an AR application stored on the mobile phone 701 to perform one or more of the functions represented in FIG. 7. Further, it will be understood that the system 700 illustrated in FIG. 7 represents an example embodiment of the process flow 100 described in connection with FIG. 1. As shown, the system 700 includes a mobile phone 701 and an AR apparatus 703. In some embodiments, the AR apparatus 703 and/or the mobile phone 701 each include a communication interface, a processor, and memory, which may contain an application and/or data, and those components may be operatively connected to each other.

In accordance with some embodiments, the AR apparatus 703 and the mobile phone 701 are operably and selectively connected to each over via one or more networks (not shown). The one or more networks may include telephone networks (e.g., cellular networks, CDMA networks, any wireline and/or wireless network over which communications to telephones and/or mobile phones are sent), local area networks (LANs), wide area networks (WANs), global area networks (GANs) (e.g., the Internet), and/or one or more other networks.

As represented by block 702, the user operates the mobile phone 701 to capture an image of an aspirin bottle as part of a real-time video stream that is generated and/or captured by the mobile phone 701. In some embodiments, the user approaches a shelf where the aspirin bottle is located. In other embodiments of the invention, the user stands at a counter, where the aspirin bottle is located behind the counter. After approaching the aspirin bottle, the user points the mobile phone 701 at the aspirin bottle, such that, for example, the aspirin bottle is within the field of view of the mobile phone 701 (e.g., within the field of view of a digital video recorder built into the mobile phone 701). Since the aspirin bottle is within the field of view of the mobile phone 701, the user captures an image of the bottle of aspirin, where the image is a single frame of a real-time video stream.

At block 704, the mobile phone 701 transmits information associated with the image of the aspirin bottle to the AR apparatus 703. The information associated with the image may be any type of information. In some embodiments, the image of the aspirin bottle may be information associated with the image, including a portion of the image. In the embodiment represented at block 704, the information associated with the image of the aspirin bottle includes the image of the aspirin bottle logo.

Further, at block 704, the mobile phone 701 transmits the image of the aspirin bottle logo using a communication interface via a network, which may comprise a telephone network (e.g., cellular networks, CDMA networks, any wireline and/or wireless network over which communications to telephones and/or mobile phones are sent), local area network (LANs), wide area network (WANs), global area network (GANs) (e.g., the Internet), and/or one or more other telecommunications networks. At block 706, the AR apparatus 703 receives the image of the aspirin bottle logo via a communication interface in AR apparatus 703.

At block 708, the AR apparatus 703 compares the image of the aspirin bottle logo to the identifying data stored in the memory of the AR apparatus 703. The identifying data may be any type of data that would identify the aspirin bottle as a qualifying product. In this example embodiment, the identifying data includes an image of a logo of a brand of aspirin that is a qualifying product. Further, at block 708, the AR apparatus 703 may use various methods to compare the image of the aspirin bottle logo to the indentifying data. In some embodiments, the AR apparatus 703 uses pattern recognition algorithms to compare the image of the aspirin bottle logo, which was transmitted to the AR apparatus 703 at block 704, to the identifying data, which in this embodiment includes the image of a logo of a brand of aspirin that is a qualifying product.

At block 710, the AR apparatus 703 determines that the image of the aspirin bottle logo corresponds to a qualifying product. In some embodiments, the AR apparatus 703 will only determine that the image of the aspirin bottle logo corresponds to a qualifying product if there is a 100% confidence match between the image of the aspirin bottle logo and the indentifying data. In other embodiments, the AR apparatus 703 will determine that the image of the aspirin bottle logo corresponds to a qualifying product if the comparison of the image of the aspirin bottle logo to the identifying data exceeds a confidence threshold. As illustrated in FIG. 7, in this embodiment, the AR apparatus 703 determines that the image of the aspirin bottle logo corresponds to a qualifying product, and then the process flow proceeds to block 712.

At block 712, the AR apparatus 703 notifies the mobile phone 701 that the image of the aspirin bottle logo corresponds to a qualifying product. In one embodiment, the AR apparatus 703 notifies the mobile phone 701 over the network by using the communication interface of AR apparatus 703. At block 714, the mobile phone 701 determines whether it is still capturing a real-time video stream of the aspirin bottle logo. In some embodiments, the mobile phone 701 compares the image of the aspirin bottle logo that the mobile phone 701 previously transmitted at block 704 to an image from a real-time video stream that the mobile phone 701 is capturing at block 714. As one of skill in the art will appreciate, the mobile phone 701 may use many different methods to determine if it is still capturing a real-time video stream of the aspirin bottle logo. If the mobile phone 701 determines that it is still capturing the aspirin bottle logo via a real-time video stream, then the process flow proceeds to block 716.

At block 716, the mobile phone 701 generates and/or displays an indicator that indicates that the aspirin bottle qualifies for purchase under the FSA. The indicator is displayed on the display of the mobile phone 701 and is superimposed over the current real-time video stream of the aspirin bottle logo (as determined in block 714) that is captured by the mobile phone 701. The indicator may be any color, size, and/or shape. For example, in some embodiments, the indicator appears as a solid, green line that surrounds the aspirin bottle logo that is shown on the display of the mobile phone 701.

Referring now to FIG. 8, a mixed block and flow diagram of a system 800 for presenting information associated with a health savings account (HSA) in an AR environment is provided, in accordance with an embodiment of the present invention. In general terms, FIG. 8 illustrates an embodiment of the invention where a user uses a mobile phone 801 to capture a still image that shows an aspirin bottle and multivitamin package (e.g., while in a pharmacy) to determine whether the aspirin and/or multivitamins are qualifying products (i.e., whether the aspirin and/or multivitamins qualify for purchase under the HSA). It will be understood that the mobile phone 801 is accessible to the user referred to in block 802. In some embodiments, the user may activate an AR apparatus (e.g., AR apparatus 330) stored on the mobile phone 801 to perform one or more of the functions represented in FIG. 8. Further, it will be understood that the system 800 illustrated in FIG. 8 represents an example embodiment of the process flow 100 described in connection with FIG. 1. As shown, the system 800 includes a mobile phone 801. In some embodiments, the mobile phone 801 includes a processor and memory, which may contain an application and/or data, and those components may be operatively connected to each other.

As represented by block 802, the user operates the mobile phone 801 to capture a still image of an aspirin bottle and a multivitamin package. In some embodiments, the user approaches a shelf where the aspirin bottle and multivitamin are located. After approaching the aspirin bottle and multivitamin package, the user points the mobile phone 801 at the aspirin bottle and multivitamin package, such that, for example, the aspirin bottle and multivitamin package are within the field of view of the mobile phone 801 (e.g., within the field of view of, and/or exposed to, a digital camera built into the mobile phone 801). Once the aspirin bottle and multivitamin package are within the field of view of the mobile phone 801, the mobile phone 801 may generate and/or capture a still image that shows the aspirin bottle and the multivitamin package.

At block 804, the mobile phone 801 identifies the terms "aspirin" and "multivitamin" from the image. The mobile phone 801 identifies these terms using any method that would be appreciated by one of ordinary skill in the art. For example, in some embodiments, the mobile phone 801 uses OCR technology to identify the terms "aspirin" and "multivitamin" from the image. At block 806, the mobile phone 801 compares the terms "aspirin" and "multivitamin" to identifying data stored in the memory of the mobile phone 801. The identifying data may be any type of data that would identify the aspirin bottle and/or multivitamin package as qualifying products. In some embodiments, the identifying data includes terms that describe qualifying products.

At block 808, the mobile phone 801 may use various methods to compare the terms "aspirin" and "multivitamin" to the indentifying data. In this embodiment, the mobile phone 801 uses text comparison technology to compare the terms "aspirin" and "multivitamin" to the indentifying data. The mobile phone 801 determines that there is a 100% match between then term "aspirin" and the identifying data. The mobile phone 801 also determines that there is no match between the term "multivitamin" and the indentifying data. Thus, as further described in relation to block 808, the mobile phone 801 determines that the term "aspirin" corresponds to a product that qualifies for purchase under the HSA but that the term "multivitamin" does not correspond to a qualifying product.

At block 810, the mobile phone 801 generates and/or displays an indicator that indicates that the aspirin bottle qualifies for purchase under the HSA. In this embodiment, the mobile phone 801 superimposes a green box over and/or around the portion of the image that shows the aspirin bottle (but not around the multivitamin package) to indicate that the aspirin is a qualifying product under the HSA. Further, at block 812, the mobile phone 801 generates and/or displays an indicator that indicates that the multivitamin package does not qualify for purchase under the HSA. In this embodiment, the mobile phone 801 superimposes a red "X" over the image of the multivitamin package (but not over the aspirin bottle) to indicate that the multivitamin package is not a qualifying product under the HSA.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method implemented by a computing device, wherein the computing device determines whether a product qualifies under a medical savings plan, the method comprising:
   receiving information associated with an image of the product, wherein the image is part of a real-time video stream captured by a mobile device;
   determining, via a processor, based at least partially on the information associated with the image, if the image shows a product that qualifies for purchase under the medical savings plan, wherein determining if the image shows a product that qualifies for purchase under the medical savings plan comprises (i) identifying the product based at least partially on the information associated with the image and (ii) determining if the product qualifies for purchase under the medical savings plan by comparing information about the product to information about a known set of products that qualify for purchase under a medical savings plan;
   displaying the real-time video stream on a display of the mobile device;
   determining, via a processor, that the real-time video stream being displayed on the display of the mobile device shows the product; and
   based upon determining that the real-time video stream being displayed on the display of the mobile device shows the product, displaying on the display of the mobile device a graphical indication that the product qualifies for purchase under the medical savings plan, the graphical indication being superimposed over the real-time video stream being displayed on the display of the mobile device.

2. The method of claim 1, wherein determining if the image shows a product that qualifies for purchase under a medical savings plan comprises determining if the product qualifies for purchase under a health savings account or flexible spending account.

3. The method of claim 1, wherein receiving information associated with the image of the product comprises receiving an image of the product.

4. The method of claim 1, further comprising: displaying, on the display of the mobile device, a review of the product.

5. The method of claim 1, further comprising: displaying, on the display of the mobile device, a contraindication of the product.

6. The method of claim 1, further comprising: displaying, on the display of the mobile device, a recommended use of the product.

7. The method of claim 1, further comprising: displaying, on the display of the mobile device, an ingredient of the product.

8. The method of claim 1, further comprising: displaying, on the display of the mobile device, a price of the product.

9. The method of claim 1, further comprising: displaying, on the display of the mobile device, a link to a website where the product can be purchased.

10. The method of claim 1, further comprising: displaying, on the display of the mobile device, a balance of the medical savings plan.

11. The method of claim 1, wherein presenting, via the mobile device, the indication of whether the product qualifies for purchase under the medical savings plan comprises presenting an indication in the image proximate to the product shown in the image.

12. The method of claim 1, wherein presenting, via the mobile device, the indication of whether the product qualifies for purchase under the medical savings plan comprises presenting an indication that can be selected by a user of the mobile device to output information about the product.

13. The method of claim 1, wherein the presenting, via the mobile device, an indication of whether the product qualifies for purchase under the medical savings plan comprises notifying the mobile device that the product qualifies for purchase under the medical savings plan.

14. An apparatus for determining whether a product qualifies under a medical savings plan, wherein the apparatus comprises:
   a communication device; and
   a processing device communicably coupled to the communication device, wherein the processing device is configured to:
   receive information associated with an image of the product, wherein the image is part of a real-time video stream captured by a mobile device;
   determine, based at least partially on the information associated with the image, if the image shows a product that qualifies for purchase under a medical savings plan, wherein determining if the image shows a product that qualifies for purchase under the medical savings plan comprises (i) identifying the product based at least partially on the information associated with the image and (ii) determining if the product qualifies for purchase under the medical savings plan by comparing information about the product to information about a known set of products that qualify for purchase under a medical savings plan;
   display the real-time video stream on a display of the mobile device;
   determine that the real-time video stream being displayed on the display of the mobile device shows the product; and
   based upon determining that the real-time video stream being displayed on the display of the mobile device shows the product, display on the display of the mobile device a graphical indication that the product qualifies for purchase under the medical savings plan, the graphical indication being superimposed over the real-time video stream being displayed on the display of the mobile device.

15. The apparatus of claim 14, wherein the medical savings plan comprises a health savings account or flexible spending account.

16. The apparatus of claim 14, wherein the information associated with the image of the product is an image of the product.

17. The apparatus of claim 14, wherein the processor is further configured to display, on the display of the mobile device, a review of the product.

18. The apparatus of claim 14, wherein the processor is further configured to display, on the display of the mobile device, a contraindication of the product.

19. The apparatus of claim 14, wherein the processor is further configured to display, on the display of the mobile device, a recommended use of the product.

20. The apparatus of claim 14, wherein the processor is further configured to display, on the display of the mobile device, information that identifies an ingredient of the product.

21. The apparatus of claim 14, wherein the processor is further configured to display, on the display of the mobile device, a price of the product.

22. The apparatus of claim 14, wherein the processor is further configured to display, on the display of the mobile device, a link to a website where the product can be purchased.

23. The apparatus of claim 14, wherein the processor is further configured to display, on the display of the mobile device, a balance of the medical savings plan.

24. The apparatus of claim 14, wherein the indication of whether the product qualifies for purchase under the medical savings plan comprises an indication that is presented in the image and proximate to the product shown in the image.

25. The apparatus of claim 14, wherein the indication of whether the product qualifies for purchase under the medical savings plan can be selected by a user of the mobile device to output information about the product.

26. The apparatus of claim 14, wherein the indication of whether the product qualifies for purchase under the medical savings comprises a notification that the product qualifies for purchase under the medical savings plan.

27. A computer program product for determining whether a product qualifies under a medical savings plan, the computer program product comprising a non-transitory computer-readable medium, wherein the non-transitory computer-readable medium comprises computer executable program code stored therein, the computer-executable program code being configured to cause a processor to:
receive information associated with an image of the product, wherein the image was part of a real-time video stream captured by a mobile device;
determine, based at least partially on the information associated with the image, if the image shows a product that qualifies for purchase under a medical savings plan, wherein determining if the image shows a product that qualifies for purchase under the medical savings plan comprises (i) identifying the product based at least partially on the information associated with the image and (ii) determining if the product qualifies for purchase under the medical savings plan by comparing information about the product to information about a known set of products that qualify for purchase under a medical savings plan;
display the real-time video stream on a display of the mobile device;
determine that the real-time video stream being displayed on the display of the mobile device shows the product; and
based upon determining that the real-time video stream being displayed on the display of the mobile device shows the product, display on the display of the mobile device a graphical indication that the product qualifies for purchase under the medical savings plan, the graphical indication being superimposed over the real-time video stream being displayed on the display of the mobile device.

28. The computer program product of claim 27, wherein determining if the image shows a product that qualifies for purchase under a medical savings plan comprises determining if the product qualifies for purchase under a health savings account or flexible spending account.

29. The computer program product of claim 27, wherein the information associated with an image of the product is an image of the product.

30. The computer program product of claim 27, wherein the computer-executable program code is configured to cause a processor to display, on the display of the mobile device, a review of the product.

31. The computer program product of claim 27, wherein the computer-executable program code is configured to cause a processor to display, on the display of the mobile device, a contraindication of the product.

32. The computer program product of claim 27, wherein the computer-executable program code is configured to cause a processor to display, on the display of the mobile device, a recommended use of the product.

33. The computer program product of claim 27, wherein the computer-executable program code is configured to cause a processor to display, on the display of the mobile device, an ingredient of the product.

34. The computer program product of claim 27, wherein the computer-executable program code is configured to cause a processor to display, on the display of the mobile device, a price of the product.

35. The computer program product of claim 27, wherein the computer-executable program code is configured to cause a processor to display, on the display of the mobile device, a link to a website where the product can be purchased.

36. The computer program product of claim 27, wherein the computer-executable program code is configured to cause a processor to display, on the display of the mobile device, a balance of the medical savings plan.

37. The computer program product of claim 27, wherein the presenting, via the mobile device, the indication of whether the product qualifies for purchase under the medical savings plan comprises presenting the indication in the image proximate to the product shown in the image.

38. The computer program product of claim 27, wherein the presenting, via the mobile device, the indication of whether the product qualifies for purchase under the medical savings plan comprises presenting an indication that can be selected by a user of the mobile device to output information about the product.

39. The computer program product of claim 27, wherein the presenting, via the mobile device, the indication of whether the product qualifies for purchase under the medical savings plan comprises notifying the mobile device that the product qualifies for purchase under the medical savings plan.

* * * * *